(12) United States Patent
Filippov

(10) Patent No.: US 11,721,227 B2
(45) Date of Patent: Aug. 8, 2023

(54) SCREEN RENDERING WORKSURFACE

(71) Applicant: MEL Science Limited, Amersham (GB)

(72) Inventor: Vasily Filippov, Chalfont St Giles (GB)

(73) Assignee: Mel Science Limited, Amersham (GB)

( * ) Notice: Subject to any disclaimer, the term of this patent is extended or adjusted under 35 U.S.C. 154(b) by 722 days.

(21) Appl. No.: 15/628,865

(22) Filed: Jun. 21, 2017

(65) Prior Publication Data

US 2017/0365179 A1 Dec. 21, 2017

Related U.S. Application Data

(60) Provisional application No. 62/352,762, filed on Jun. 21, 2016.

(51) Int. Cl.
| | |
|---|---|
| *G09B 5/02* | (2006.01) |
| *G06F 3/044* | (2006.01) |
| *G09B 19/00* | (2006.01) |
| *G09B 5/12* | (2006.01) |
| *G09B 23/24* | (2006.01) |
| *G06F 3/0354* | (2013.01) |

(52) U.S. Cl.
CPC ............... *G09B 5/02* (2013.01); *G06F 3/044* (2013.01); *G09B 5/125* (2013.01); *G09B 19/00* (2013.01); *G09B 23/24* (2013.01); *G06F 3/03545* (2013.01)

(58) Field of Classification Search
CPC .......... G09B 5/02; G09B 5/125; G09B 19/00; G06F 3/03545; G06F 3/044
See application file for complete search history.

(56) References Cited

U.S. PATENT DOCUMENTS

| | | | | |
|---|---|---|---|---|
| 5,332,238 A | * | 7/1994 | Borucki | G06F 3/043 277/654 |
| 6,632,122 B2 | * | 10/2003 | Klitsner | A63H 17/395 446/441 |
| 8,823,733 B2 | * | 9/2014 | Shimura | G06F 3/03545 345/173 |
| 8,963,875 B2 | * | 2/2015 | Sugiura | G06F 3/04166 178/18.05 |
| 11,269,456 B1 | * | 3/2022 | Eilers | G06F 3/04186 |
| 2012/0184833 A1 | * | 7/2012 | Kapoor | A61B 5/14521 600/346 |

(Continued)

*Primary Examiner* — Milap Shah
(74) *Attorney, Agent, or Firm* — Armis IP Law, LLC

(57) ABSTRACT

A screen overlay for a personal electronic device coupled with an educational application launched on the device provides a work surface for engaging in fluidic based chemistry experiments while shielding the device from the liquid used for the experiments. The screen overlay has liquid encapsulating regions for retention of a pooled liquid deposited on the overlay, and is transmissive of touch signals to a touch screen on the device. An educational application executing on the device renders predetermined regions on the device display that are coordinated with the fluid retention regions. A liquid deposition vessel such as a dropper has a conductive outer surface for engaging a user's grasp, and a wire or conductor is adapted to extend through the pooled liquid for contact with the screen overlay. The screen overlay is transmissive of capacitance signals emanating from the user for indicating fluidic presence to the educational application on the device.

19 Claims, 5 Drawing Sheets

(56) References Cited

U.S. PATENT DOCUMENTS

| | | | | |
|---|---|---|---|---|
| 2012/0256867 A1* | 10/2012 | Annacone | ............... | G06F 3/044 |
| | | | | 345/174 |
| 2014/0157486 A1* | 6/2014 | Del Rio Audibert | ... | G06F 3/014 |
| | | | | 2/161.2 |
| 2014/0160044 A1* | 6/2014 | Yairi | ........................ | G06F 3/016 |
| | | | | 345/173 |
| 2015/0022481 A1* | 1/2015 | Andersson | .............. | G06F 3/044 |
| | | | | 345/174 |
| 2015/0317034 A1* | 11/2015 | Kent | .................... | G06F 1/1656 |
| | | | | 345/175 |
| 2016/0259448 A1* | 9/2016 | Guarneri | .............. | G06F 3/04186 |
| 2017/0052625 A1* | 2/2017 | Bryant | ................ | G06F 3/04883 |
| 2018/0011596 A1* | 1/2018 | Korapati | ............. | G06F 3/04186 |

\* cited by examiner

SCREEN RENDERING WORKSURFACE

RELATED APPLICATIONS

This application claims the benefit under 35 U.S.C. §119 (e) of U.S. Provisional Patent Application No. 62/352,762, filed Jun. 21, 2016, entitled "SCREEN RENDERING WORKSURFACE," incorporated herein by reference in entirety.

BACKGROUND

Experimental chemistry sets (also known as "kits") are educational products that are used by children and adults to perform chemistry experiments. They typically include chemistry reagents, test tubes, flasks, and other labware and instructions. Fluid based combinations, often using drops of liquid from a handheld syringe, dropper or pipette, may involve intended and unintended fluid deposits around a work surface. Such liquids can be detrimental to educational hardware, computers and/or other screen based devices in the vicinity.

SUMMARY

A screen overlay for a personal electronic device coupled with an educational application launched on the device provides a worksurface for engaging in fluidic based chemistry experiments while shielding the device from the liquid used for the experiments. The screen overlay has liquid encapsulating regions for retention of a pooled liquid deposited on the overlay, defined by ridges, raised or embossed structures, or hydrophobic treatment for demarcating the fluidic retention regions, and is transmissive of touch signals to a touch screen on the device. An educational application executing on the device renders predetermined regions on the device display that are coordinated with the fluid retention regions. A liquid deposition vessel such as a dropper has a conductive outer surface for engaging a user's grasp, and a wire or conductor is adapted to extend through the pooled liquid for contact with the screen overlay. The screen overlay is transmissive of capacitance signals emanating from the user, along the conductor for sensing as a capacitive-based touch in the device screen for indicating fluidic presence to the educational application on the device.

Configurations herein provide an educational apparatus, including a rendering device operable for displaying educational guidance, and a protective barrier on the rendering device. Receptive regions on an external surface of the protective barrier are adapted to retain fluid in the receptive region for preventing fluidic flow on the protective barrier outside the receptive region, and are such that the receptive regions are disposed based on a positional alignment with the displayed educational guidance.

The receptive regions may be treated or textured to resist fluid transfer, and may be defined by embossed outlines or container walls for impeding fluid flow. The rendering device has a screen area operative for displaying images and predetermined regions corresponding to the receptive regions, such that the screen area is receptive to fluid deposition via touch-sensitive input.

The disclosed configurations are based, in part, on the observation that educational approaches in science often involve a lab environment, where physical lab apparatus (containers, tubes, wires and fluids) are present. Unfortunately, conventional approaches to labs is often based on a textbook, whiteboard or other guidance distant from the actual lab process. A disconnect between passive guidance on a whiteboard or textbook may result, for example, in improper or erroneous procedure, such as placing or depositing fluids or objects in a manner inconsistent with the lab guidance. Hazardous results may even occur if incompatible liquids are erroneously mixed. Accordingly, configurations herein substantially overcome the above described shortcomings of conventional procedures by providing an educational application operable on a tablet or smartphone and accompanying display, and employ a protective barrier with liquid containing regions coordinated with the display for complementing visual cues from the application with the locations where fluids and other experimental media are to be deposited.

Educational guidance from an educational application such as a chemistry experiment demonstration allows experimental materials such as liquids and powders to be deposited directly on the transparent protective barrier in locations where guided by the rendered images and instructions on the screen. The educational guidance includes images on the rendering device aligned with corresponding receptive regions on the protective barrier, so that depositions of experimental substances occur on the barrier and not directly on the screen where damage might occur.

The receptive regions are adapted for electrical communication with an applicator for detecting fluidic presence on the receptive region. For example, in a particular arrangement, the applicator includes a wire coupled to the applicator for extending an electrical signal to the screen area via the receptive regions. The wire terminates in a non-conductive portion for completing the electrical communication via an applicator applied fluid drop, so that a fluidic drop will not be detected until it reaches the end of the applicator and the droplet contacts the screen while still in communication with the wire for completing a capacitive or other electrical coupling from the user. Therefore, the fluid drop completes a capacitive coupling between the applicator and the touch-sensitive screen area, as the droplet and wire effectively extends the capacitive characteristics of contact with a finger of a user.

In an example configuration, the receptive regions are defined by hydrophobic outlines adapted to surround and contain liquid depositions on the protective barrier. Drops on the barrier therefore remain within boundaries defined by the barrier, and coordinated with the screen images displaying the instructions and other features (arrows, color indicators, etc.).

In one configuration, the protective barrier is defined by opposed planar sheets, bonded around a circumferential portion of the sheets and having an opening for insertion of the rendering device between the opposed planer sheets, having the general appearance of a pocket around the computing device. It is anticipated that the rendering device is a processor driven computing device and the screen area is an electronic screen responsive to the computing device, such as a tablet or laptop computer, or personal mobile device or phone having similar capabilities for apps, user interaction and visual rendering.

In one example, educational guidance is derived from a chemistry application executable on the rendering device, such that the chemistry application is configured for rendering the images of predetermined regions corresponding to the receptive regions, such as a colored or labeled circle. The chemistry application is configured for rendering graphics depicting molecular level reactions corresponding to reactions occurring in the receptive regions, and are complemented by the application driven renderings of labels, text, symbols, or other graphical or visual assistance for guiding an experiment. Further, the protective screen is not limited to usage with chemistry, but could be employed for a wide variety of educational or industrial usage in harsh environments.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations depicted below present example embodiments of the disclosed approach in the form of a tablet application (app) launched and executed on a tablet device. Other suitable platforms, such as any personal device having a touch screen may be utilized, as well as a touchscreen peripheral interfaced with a desktop or larger computing platform. Personal electronic devices are commonplace, and may be known by many names, such as mobile phones, mobile devices, smartphones, tablets, laptops, pads, and refer to any portable electronic device capable of launching and executing software based applications for rendering visual images and receiving user input.

Figure 1:
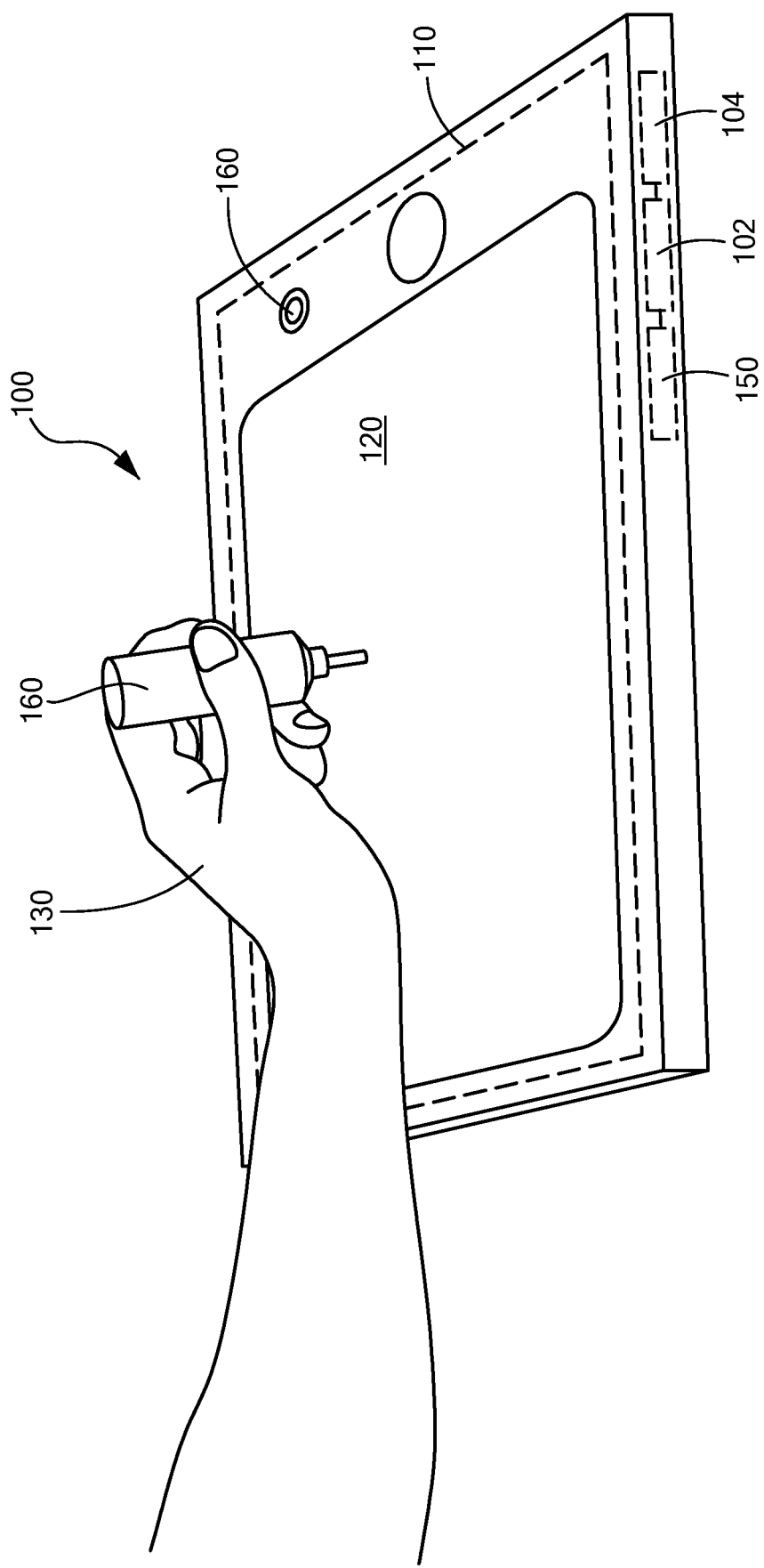
FIG. 1 is a context diagram of an educational environment having a user device suitable for use with the disclosed approach.

FIG. 1 is a context diagram of an educational environment having a user device suitable for use with the disclosed approach. Referring to FIG. 1, an educational rendering device 100 receives a screen overlay 110 allowing for visual transmission of images from a touchscreen display 120 on the device 110. The screen overlay 110 is transparent and is adapted to transmit signals to the touchscreen display 120 for sensing an input based on a contact from a user 130. The screen overlay 110 is adapted to lie disposed in contact with the touchscreen display 120 for passing through "touch" signals, or electrical capacitance based signals, discussed further below. If the educational device 100 includes a front-facing camera 106, the overlay 110 may also cover the camera lens for allowing visual detection of deposited liquids.

The educational rendering device 100 includes a processor 102 and memory 104 for supporting a rendering application 150 operative to render an indication of a predetermined region on the touchscreen display 120 and sense the input directed to the predetermined region. Further, the screen overlay 110 is adapted for retention of a pooled liquid deposited on the predetermined region, also discussed further below.

In the example configuration, the touchscreen display 120 is a capacitive display based on a sensed capacitance resulting from electrical communication with the user 130. Touchscreens allow a user to direct input directly to the display screen of a device, in contrast to conventional keyboard input. Touchscreens sense a touch of a user by various methods, including pressure, optical, and capacitance. The disclosed approach employs capacitance as an example touch medium, however other mediums may be employed.

In the example configuration, where the screen overlay 110 is a capacitance transmissive screen overlay adapted for transmitting electrical signals indicative of capacitance resulting from electrical communication with a user 130, touch sensations from the user 130 pass though the overlay 110 for reception by the touchscreen display.

However, in contrast to conventional approaches, the disclosed approach employs a peripheral user device such as a dispensing vessel 160 adapted to selectively dispense drops of a liquid upon compression ("squeezing") by the user 130. The disclosed dispensing vessel 160 resembles a fluid dropper, and is constructed of a resilient hermetically sealing material, typically plastic. Touch signals of a user are passed via the dispensing vessel 160, through the screen overlay 110 to the touchscreen display 120, as if the user had touched the touchscreen display 120 directly, allowing the rendering application 150 to detect the presence and location of a dropper deposited liquid on the screen overlay 110. No interface or tether to the device 100 is needed to sense dispensing vessel 160 activity and deposition, since a native capacitance of a user's touch is effectively transmitted via electrical conduction from the user 130 to the display 120.

Figure 2:
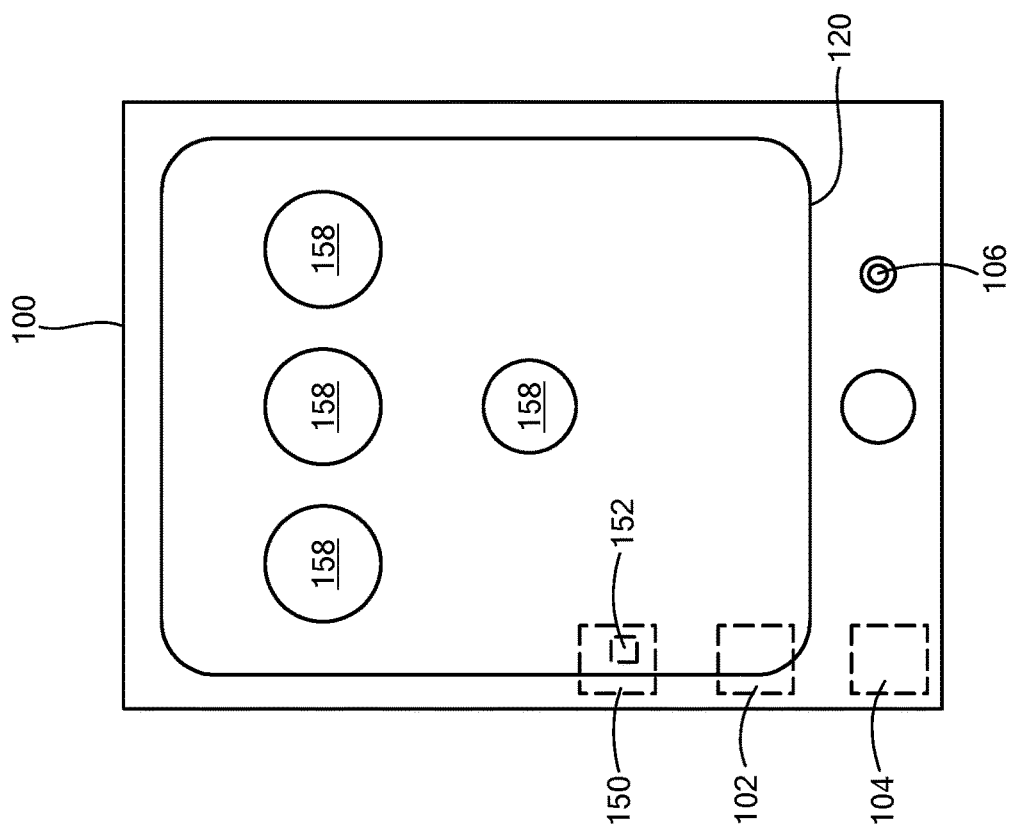
FIG. 2 is a plan view of a touchscreen device in the environment of FIG. 1.

FIG. 2 is a plan view of a touchscreen device 100 in the environment of FIG. 1. Referring to FIGS. 1 and 2, the rendering application 150 can display predetermined regions 158 defined by a location and area on the touchscreen 120. The rendering application 150 includes fluid detection logic 152 operable for detecting, via electric conduction through the deposited liquid, a presence of the liquid in the predetermined region 158 specified by the fluid detection logic 152. The screen overlay 110 retains fluid droplets and protects the display 120, while the fluid detection logic 152 identifies the presence of droplets in the predetermined regions 158.

Figure 3:
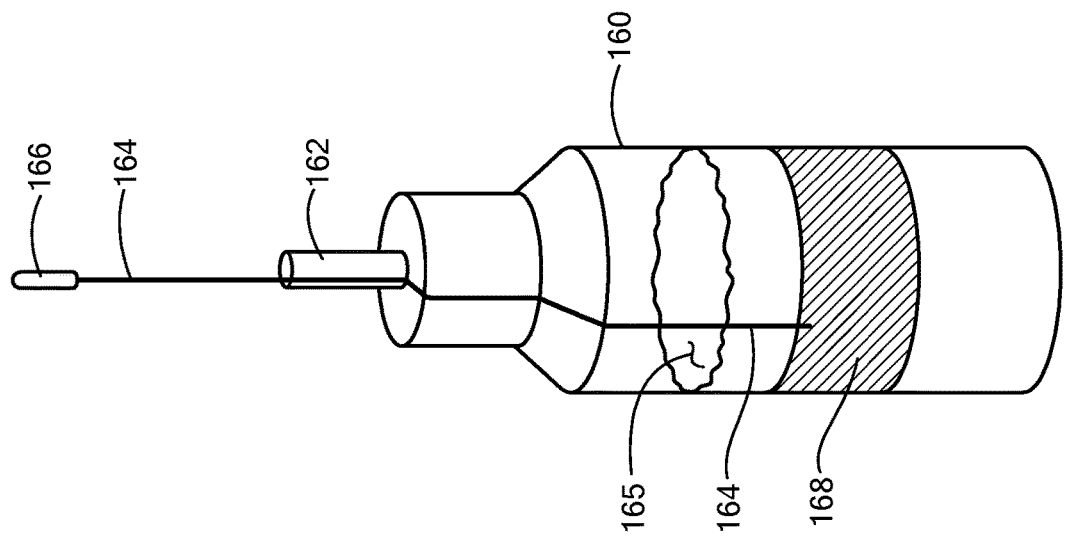
FIG. 3 is a perspective view of a dropper in the environment in FIG. 1.

FIG. 3 is a perspective view of a dropper in the environment in FIG. 1. The dispensing vessel 160 takes the form of a dropper for dispensing liquid in pursuit of screen directed chemistry experiments. Several drops dispensed from the dropper form a small pool on the overlay 110. The dispensing vessel 160 has a nozzle 162 or elongated tapered form through which liquid 165 in the dropper may pass, typically in response to inversion and compression (i.e. "squeezing" the dropper). The dropper further includes a conductor 164, such as a narrow gauge wire, extending from a fluid egress on the dropper to the pooled liquid for providing the electrical communication from a user touch. The screen overlay 110 is responsive to the dropper for electrical communication with the pooled liquid for transmitting the capacitive based touch signal to the capacitive display 120. A conductive band 168 around the dropper is in electrical communication with the conductor 164 and responsive to user contact. Continuity for electrical coupling of sensed capacitance is defined by the conductive band 168, conductor 164, overlay 110 and touchscreen 120. The pooled liquid may provide an element of conductivity, or the conductor 164 may directly contact the overlay 110.

Figure 4:
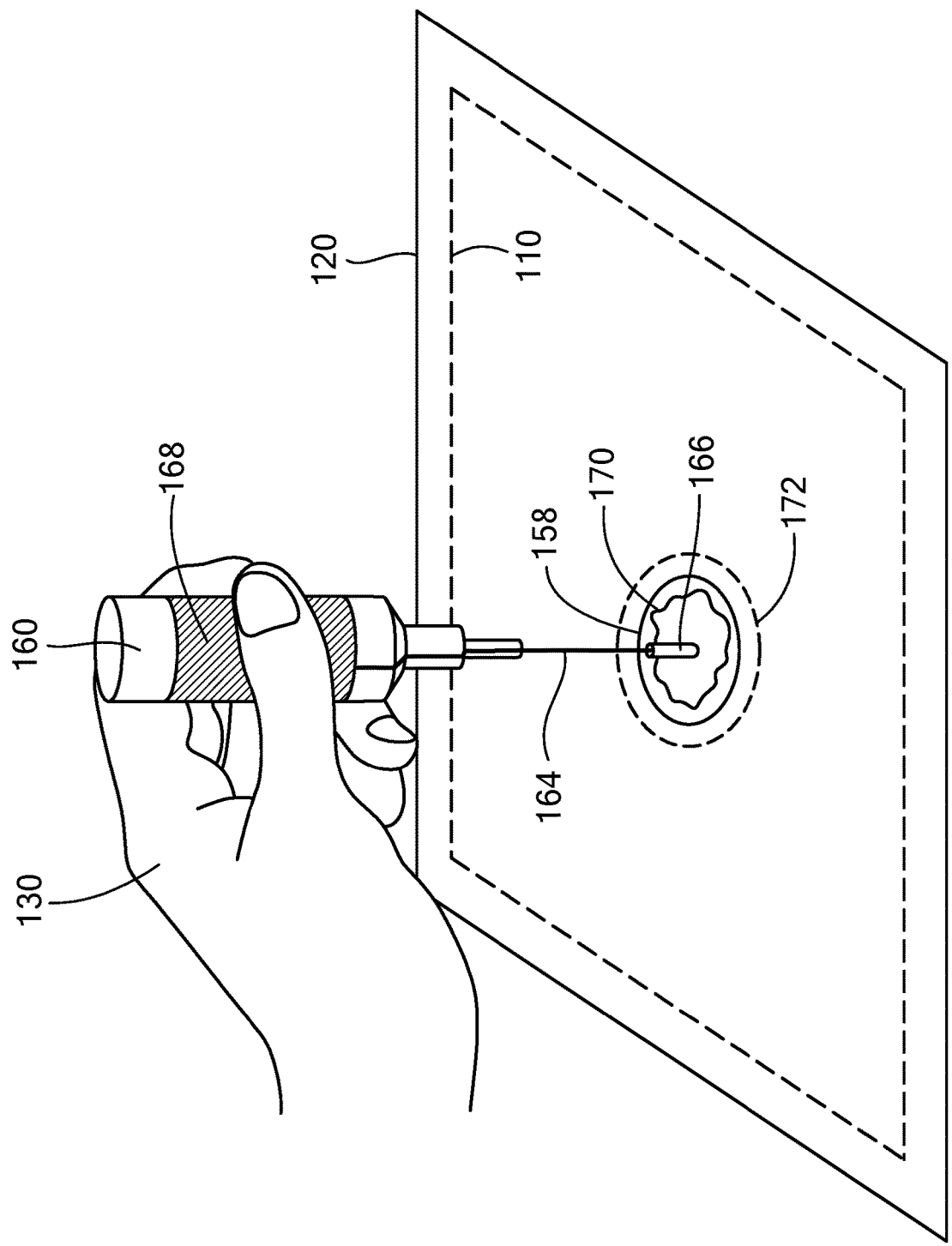
FIG. 4 shows the dropper of FIG. 2 in communication with the touchscreen of FIG. 2.

FIG. 4 shows the dropper of FIG. 2 in communication with the touchscreen of FIG. 3. Upon inversion, the dispensing vessel 160 deposits several drops to form a pool of liquid 170 from the contained liquid 165. Hydrophobic areas 172 on the screen overlay 110 collect and channel liquids, and are substantially aligned with the predetermined regions 158 where the fluid detection logic 152 will poll or evaluate for a fluidic presence.

The conductor 164 has an electrically insulating region 166 at a distal end, such that the insulating region 166 is adapted to prevent electrical communication with the screen overlay 110 until the pooled liquid 170 is present and contacts an uninsulated portion of the conductor.164. This allows the fluid detection logic 152 to avoid false or "dry" triggering from mere contact of the conductor wire 164. Capacitance sensing will not occur until electrical continuity is established, either by pooled liquid 170 receiving the conductor 164, or in the case of non-conductive liquid, actual contact from the conductor 164 rather than the first contact with the insulated region 166. In other words, fluid is detected when a substantial sized pool 170 is accumulated for receiving more than just a glancing brush of the conductor 164.

Figure 5:
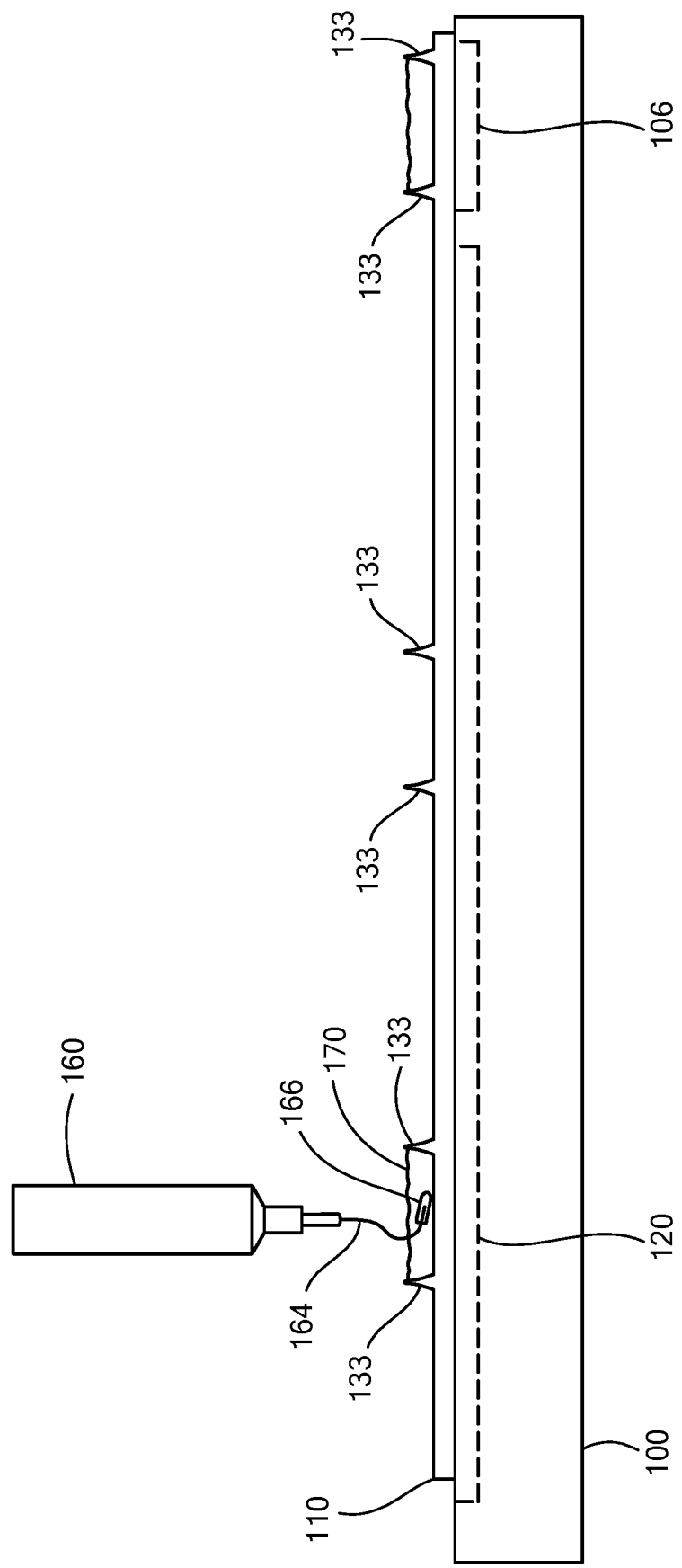
FIG. 5 shows a side view of the dropper in electrical communication with the screen overlay for capacitive sensing in a particular configuration of the dropper and overlay arrangement.

FIG. 5 shows a side view of the dropper in electrical communication with the screen overlay 110 for capacitive sensing in a particular configuration of the dropper and overlay arrangement. The pooled liquid 170 may be constrained by either the hydrophobic areas 172 surrounding the predetermined regions 158, or the screen overlay 110 may be embossed with an outline of a region adapted to retain liquid based on circumferential raised relief edges 133 of the embossing, or alternatively by a suitable raised area such as a lip from 3D printing or layered material. The capacitance transmissive screen overlay 110 may also be employed using a stylus separate from the dispensing vessel 160. The screen overlay 110 is also responsive to a stylus extending from a grip of a user 130 to a previously dispensed pooled liquid 170 for providing the electrical communication.

Figure 6A:
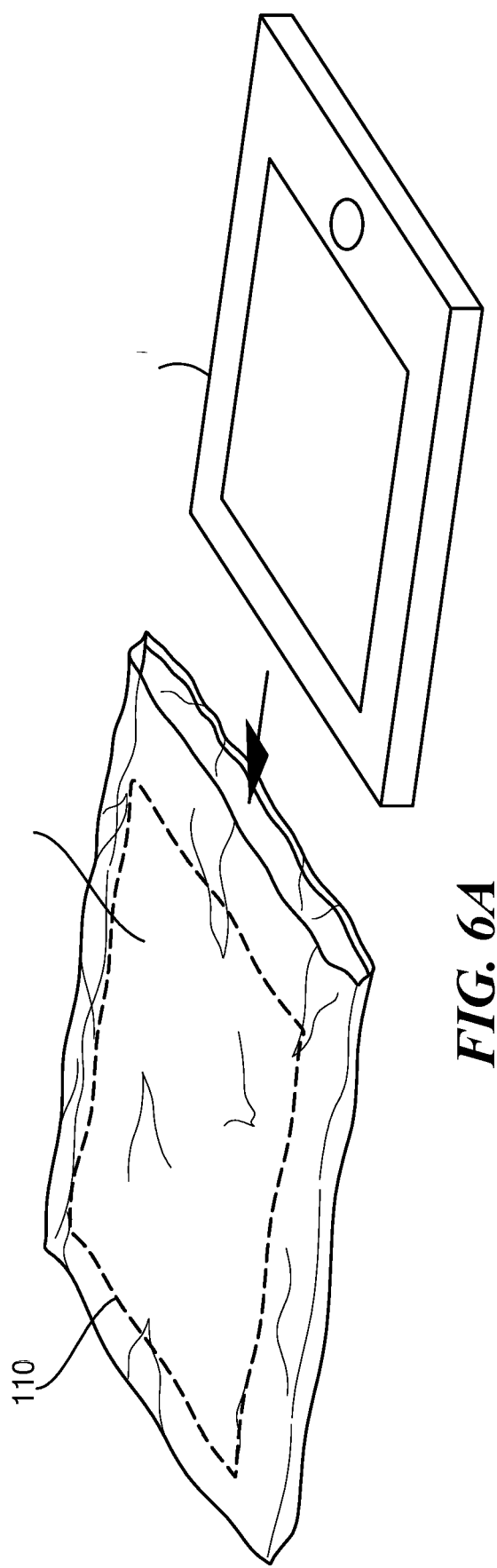
FIGS. 6A and 6B show the screen overlay implemented on an insertable pouch surrounding the user device
Figure 6B:
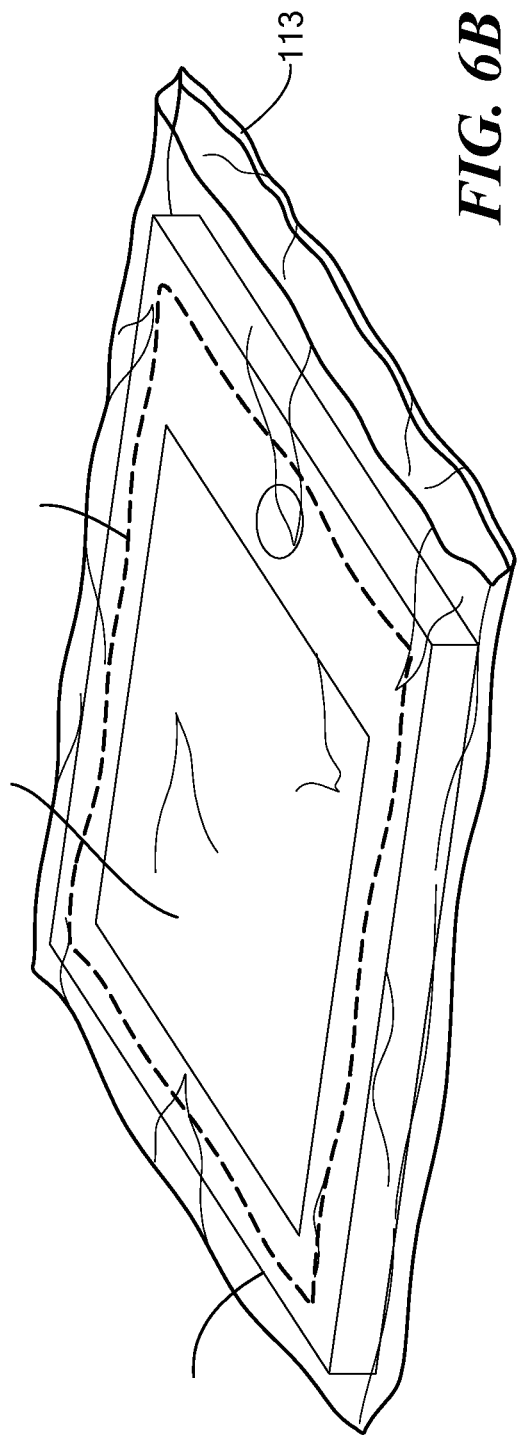

FIGS. 6A and 6B show the screen overlay implemented on an insertable pouch surrounding the user device. Referring to FIGS. 6A and 6B, the screen overlay 110 may be defined by a circumferential enclosure 111 or bag shaped structure formed from opposed, flexible planar sheets and having an opening along at least one end for insertion of the device. Thu user 130 inserts the device 100 into the opening of the bag between the opposed bag sides, and at least a front facing surface of the bag has capacitance transmissive properties of the screen overlay 110. An optional closure 113 may seal the bag for additional protection from liquids. Alternatively, the screen overlay 110 may be rested in place on the device 100 or held with a mild adhesive or other suitable securing approach.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An educational rendering device, comprising:
   a screen overlay for transmitting signals to a touchscreen display for sensing an input via a sensed contact from a user; and
   a rendering application operative to render an indication of a predetermined region on the touchscreen display and sense the input directed to the predetermined region, the screen overlay for retention of a pooled liquid deposited on the predetermined region, the screen overlay for transmitting electrical signals indicative of capacitance resulting from electrical communication with the user via the pooled liquid.

2. The device of claim 1 wherein the touchscreen display is a capacitive display based on a sensed capacitance resulting from electrical communication with the user.

3. The device of claim 2 wherein the screen overlay is responsive to a stylus extending from the grip of a user to the pooled liquid for providing the electrical communication.

4. The device of claim 2 wherein the screen overlay is responsive to a dropper in electrical communication with the pooled liquid for transmitting the capacitive based touch signal to the capacitive display.

5. The device of claim 1 further comprising hydrophobic areas on the screen overlay to collect and channel liquids.

6. The device of claim 3 wherein the screen overlay is embossed with an outline of a region shaped to retain liquid based on circumferential raised relief edges of the embossing.

7. The device of claim 1 wherein the rendering application includes fluid detection logic responsive for detecting, via electric conduction through the deposited liquid, a presence of the liquid in the predetermined region specified by the fluid detection logic.

8. The device of claim 1 wherein the screen overlay is defined by a first flexible planar sheet of a circumferential enclosure formed from opposed, first and second flexible planar sheets and having an opening along at least one end of the circumferential enclosure for insertion of the device.

9. An educational rendering device, comprising:
   a screen overlay for transmitting signals to a touchscreen display for sensing an input via a sensed contact from a user; and
   a rendering application operative to render an indication of a predetermined region on the touchscreen display and sense the input directed to the predetermined region, the screen overlay for retention of a pooled liquid deposited on the predetermined region,
   wherein the touchscreen display is a capacitive display based on a sensed capacitance resulting from electrical communication with the user;

the screen overlay is responsive to a dropper in electrical communication with the pooled liquid for transmitting the capacitive based touch signal to the capacitive display;

the dropper further comprises a conductor extending from a fluid egress on the dropper to the pooled liquid for providing the electrical communication.

10. The device of claim 9 wherein the conductor has an electrically insulating region at a distal end, the insulating region configured to prevent electrical communication with the screen overlay until the pooled liquid is present and contacts an uninsulated portion of the conductor.

11. The device of claim 9 further comprising a conductive band around the dropper, the conductive band in electrical communication with the conductor and responsive to user contact.

12. A method of rendering interactive educational media, comprising: rendering a visual indication of a predetermined region responsive to touchscreen input; and receiving a touchscreen display signal indicative of input corresponding to the rendered predetermined region, the received signal operable to pass through a screen overlay and pooled liquid deposited thereon, the screen overlay being transmissive of capacitance for transmitting electrical signals indicative of capacitance resulting from electrical communication with a user via the pooled liquid.

13. The method of claim 12 wherein the touchscreen display is a capacitive display based on a sensed capacitance resulting from electrical communication with the user.

14. The method of claim 13 wherein the screen overlay is responsive to a dropper in electrical communication with the pooled liquid for transmitting the capacitive based touch signal to the capacitive display.

15. The method of claim 14 wherein the dropper further comprises a conductor extending from a fluid egress on the dropper to the pooled liquid for providing the electrical communication.

16. The method of claim 12 wherein the screen overlay is a capacitance transmissive screen overlay, further comprising transmitting, through the screen overlay, electrical signals indicative of capacitance resulting from electrical communication with a user.

17. The method of claim 12 further comprising pooling the liquid via retention from ridges or hydrophobic areas on the screen overlay to collect and channel liquids.

18. The method of claim 12 further comprising embossing the screen overlay with an outline of a region shapedadaptcd to retain liquid based on circumferential raised relief edges of the embossing.

19. A computer program product on a non-transitory computer readable storage medium having instructions that, when executed by a processor, perform a method of method of rendering interactive educational media, the method comprising:

rendering a visual indication of a predetermined region responsive to touchscreen input;

receiving a touchscreen display signal indicative of input corresponding to the rendered predetermined region, the received signal configured to pass through a screen overlay and a pooled liquid deposited thereon;

detecting, by a rendering application including fluid detection logic, via electric conduction through the pooled liquid, a presence of the pooled liquid in the predetermined region specified by the fluid detection logic, wherein the touchscreen display is a capacitive display based on a sensed capacitance resulting from electrical communication with a user; and transmitting the touchscreen display signal to the capacitive display via a dropper in electrical communication with the pooled liquid, the screen overlay responsive to the dropper for electrical communication with the pooled liquid.

* * * * *